United States Patent [19]

Shaw et al.

[11] Patent Number: 4,965,034

[45] Date of Patent: Oct. 23, 1990

[54] BLENDS AND FILMS OF LINEAR ETHYLENE POLYMERS WITH POLYURETHANE AND METHOD OF THEIR EXTRUSION

[75] Inventors: Richard G. Shaw, Remsen, N.Y.; Tien-Kuei Su, Belle Mead, N.J.

[73] Assignee: Mobil Oil Corporation, Fairfax, Va.

[21] Appl. No.: 307,142

[22] Filed: Feb. 6, 1989

Related U.S. Application Data

[63] Continuation of Ser. No. 91,578, Aug. 31, 1987, abandoned.

[51] Int. Cl.$^5$ .......................... D01F 1/02; C08L 75/00
[52] U.S. Cl. .................................... 264/211; 264/108; 525/123; 525/131
[58] Field of Search ................. 525/123, 131; 264/211, 264/108

[56] References Cited

U.S. PATENT DOCUMENTS 3,970,715  7/1976  Jarrett ................................. 525/130
4,394,474  7/1983  McKinney et al. ................. 264/211
4,701,487  10/1987  Hakim ................................. 264/211

FOREIGN PATENT DOCUMENTS 65740  4/1983  Japan ................................. 525/123
1163266  9/1969  United Kingdom ................ 525/123

OTHER PUBLICATIONS

Short, J. N., Olefin Polymers (Low Pressure LDPE), Encyclopedia of Chemical Technology, Kirk-Othmer, 3rd Ed., J. Wiley & Sons, 1981, vol. 16, 385–390.
Hoga, J. P., Olefin Polymers (Linear HDPE), Encyclopedia of Chemical Technology, Kirk-Othmer, 3rd Ed., J. Wiley & Sons, 1981, vol. 16, 421–425.

Primary Examiner—Ana L. Carrillo
Attorney, Agent, or Firm—A. J. McKillop; C. J. Speciale; M. J. Mlotkowski

[57] ABSTRACT

Head pressure and extruder torque in the extrustion of linear ethylene polymers such as linear low density polyethylene (LLDPE) are reduced by adding a small amount (less than 5 weight percent) of a thermoplastic polyurethane. Films extruded from the blend exhibit better surface appearance by reduction of melt fracture.

24 Claims, No Drawings

BLENDS AND FILMS OF LINEAR ETHYLENE POLYMERS WITH POLYURETHANE AND METHOD OF THEIR EXTRUSION

This is a continuation of application Ser. No. 091,578, filed on Aug. 31, 1987, now abandoned,

BACKGROUND OF THE INVENTION

It is well known that LLDPE (linear low density polyethylene), such as copolymers of ethylene and hexene, generally produce films of superior properties over high pressure highly branched low density polyethylenes (LDPE). LLDPE films exhibit higher tensile strength, outstanding puncture resistance and enhanced impact strength. Similarly, linear ethylene polymers such as high density polyethylene exhibit excellent properties for some purposes. However, the extrudability of linear ethylene polymers including LLDPE is poor mainly because of their high shear viscosity. Due to the absence of long chain branching in LLDPE its shear viscosity exhibits less shear thinning than branched LDPE. This non-Newtonian rheological behavior brings about extrusion difficulties by increasing extrusion head pressure resulting in high motor amperage and high torque which limits the output under a given set of extrusion conditions compared to that possible with prior art LDPE resins.

Furthermore, the extrusion problem is frequently accompanied by the appearance of surface irregularities on the produced film. Surface irregularities or more generally, "fracture" occur over a range of shear rate depending on the molecular characteristics of the polymer. These are characterized by closely spaced circumferential ridges along the extrudate when extruded through a capillary die. In a more severe form it resembles what is generally known as "sharkskin." The onset of melt fracture is believed to occur at or above a critical shear stress although the concept is yet to be fully understood.

In the past many attempts were made to alleviate the extrusion problems encountered with LLDPE. For example, blends of linear low density polyethylenes with LDPE (branched high pressure low density polyethylene) are known. The use of various kinds of processing aids such as low molecular weight hydrocarbons, fatty amides or bis-amides, fluorelastomers and certain silicon polymers is also known.

U.S. Pat. No. 3,970,715 describes compositions comprising a major proportion of a thermoplastic polyurethane and a minor proportion of an ethylene copolymer such as ethylene vinyl acetate copolymer to improve the abrasion and the blocking characteristics of the polyurethane. In accordance with this invention a minor amount of a thermoplastic polyurethane is added to a linear ethylene polymer to improve its extrusion behavior.

SUMMARY OF THE INVENTION

A small amount of about 0.01 to 5.0 weight percent of a thermoplastic polyurethane polymer is added to a linear polyethylene as a processing aid resulting in reduced head pressure and power consumption during extrusion into films permitting higher output rates. The polyurethane also contributes to improved surface appearance of the films by reduction or elimination of melt fracture commonly encountered in the extrusion of linear ethylene polymers.

DETAILED DESCRIPTION OF THE INVENTION

The linear ethylene polymers whose extrusion behavior is improved in accordance with this invention are either homopolymers of ethylene or copolymers of ethylene and a higher olefin, particularly linear low density polyethylene LLDPE. The LLDPE generally contains up to about 10 weight percent of polymerized higher alpha olefin and has a density between about 0.9 to about 0.94, preferably less than 0.930. The melt index (MI) is usually from about 0.4 to about 4 or more and preferably from about 0.6 to about 2. LLDPE copolymers of ethylene and hexene are particularly preferred.

The thermoplastic polyurethane additives are commercially available materials. A wide variety of such materials are suitable such as described in the following examples and as described in U.S. Pat. No. 3,970,715 which is incorporated herein by reference. The polyurethane is generally added in the smallest amount needed to achieve its purpose, usually about 0.01 to 5 weight percent and preferably 0.05 to 3 weight percent.

As in other polyolefin compositions, stabilizers, antioxidants, plasticizers, pigments, fillers and similar additives can be incorporated into the blends of the present invention. The compositions of the present invention can be fabricated into film, fiber, sheeting, rod, tubing, pipe and a variety of molded objects, using methods generally employed in the fabrication of polyolefins. In particular, the compositions of the present invention are outstanding as film resins.

The blends of this invention can be prepared in any way known to those skilled in the art. Thus, a physical mixture of the polymers in powder or in pellet form can be blended into a uniform composition in a Banbury mixer or by milling the composition on calendar rolls using temperatures above the melting point of the higher melting component. In a preferred embodiment, a rough mixture of the polymers is put through a melt extruder containing a mixing extrusion screw or a mixing section on the extrusion screw. The resins may also be in the form of granules and may be blended as either granules or pellets or mixtures thereof. Other means of obtaining a homogeneous blend will be apparent to those skilled in the art.

The invention is illustrated by the following examples in which all parts are by weight unless otherwise indicated.

EXAMPLES 1–5

A ⅜ inch Brabender extruder with a circular string die with a diameter of 0.062 inches was used to evaluate processability and extrudate quality. The LLDPE used in these examples is Mobil NTA-101, a copolymer of ethylene and hexene (MI=1, density=0.918 g/cm$^3$) and the polyurethane is Mobay polyester based polyurethane (Texin 688-A, density=1.20 g/cm$^3$).

TABLE 1

| Example | Wt. % Texin 688A | RPM | Pressure, PSI | Torque, M-g. | Shear Rate Sec$^{-1}$ | Melt Fracture |
|---|---|---|---|---|---|---|
| Control | 0 | 30 | 2550 | 3250 | 100 | Yes |
|  |  | 50 | 3000 | 4000 | 165 | Yes |
|  |  | 80 | 3300 | 5100 | 290 | Yes |
| 1 | 1.0 | 30 | 2200 | 2300 | 100 | No |
|  |  | 50 | 2750 | 3200 | 165 | No |
|  |  | 80 | 3100 | 3900 | 290 | No |
| 2 | 1.0 | 30 | 2300 | 2400 | 100 | No |

TABLE 1-continued

| Example | Wt. % Texin 688A | RPM | Pressure, PSI | Torque, M-g. | Shear Rate Sec$^{-1}$ * | Melt Fracture |
|---|---|---|---|---|---|---|
|   |      | 50 | 2800 | 3300 | 165 | No |
| 3 | 0.5  | 50 | 2800 | 3400 | 165 | No |
| 4 | 0.1  | 50 | 2800 | 3400 | 165 | No |
| 5 | 0.05 | 50 | 2800 | 3500 | 165 | No |

Examples 1, 3, 4 and 5 were prepared by dry blending NTA-101 and NTA-101/Texin 688-A concentrate to give the overall composition as indicated. The blends of Example 2 were prepared by dry blending NTA-101 and Texin 688-A directly.

We claim:

1. A composition comprising a blend of LLDPE and up to 5 weight percent of a thermoplastic polyurethane polymer sufficient to reduce extruder torque and head pressure encountered in the extrusion of said LLDPE.

2. The composition of claim 1 in which said thermoplastic polyurethane polymer comprises 0.01 to 5.0 weight percent of the 3. The composition of claim 1 in which said thermoplastic polyurethane polymer comprises 0.05 to 3 weight percent of the composition.

4. The composition of claim 1 in which said LLDPE has a density of less than 0.93 g/cm$^3$.

5. The composition of claim 2 in which said LLDPE has a density of less than 0.93 g/cm$^3$.

6. The composition of claim 3 in which said LLDPE has a density of less than 0.93 g/cm$^3$.

7. The composition of claim 1 in the form of a film.

8. The composition of claim 2 in the form of a film.

9. The composition of claim 3 in the form of a film.

10. The composition of claim 4 in the form of a film.

11. The composition of claim 5 in the form of a film.

12. The composition of claim 6 in the form of a film.

13. The composition of claim 1 in which said thermoplastic polyurethane polymer comprises 0.05 to 1.0 weight percent of the composition.

14. The composition of claim 13 in which said LLDPE has a density of less than 0.93 g/cm$^3$.

15. The composition of claim 13 in the form of a film.

16. The composition of claim 14 in the form of a film.

17. An improved method for extruding LLDPE into a film in which the improvement comprises adding to said LLDPE a thermoplastic polyurethane polymer in an amount less than 5 weight percent sufficient to reduce the extruder torque and head pressure encountered in the extrusion of said LLDPE in the absence of said thermoplastic polyurethane polymer.

18. The method of claim 17 in which said LLDPE has a density of 0.93 g/cm$^3$ or less.

19. The method of claim 11 in which 0.01 to 5.0 weight percent of the thermoplastic polyurethane is added to said LLDPE.

20. The method of claim 17 in which 0.05 to 3.0 weight percent of the thermoplastic polyurethane is added to said LLDPE.

21. The method of claim 17 in which 0.05 to 1.0 weight percent of the thermoplastic polyurethane is added to said LLDPE.

22. The method of claim 19 in which said LLDPE has a density of 0.93 g/cm$^3$ or less.

23. The method of claim 20 in which said LLDPE has a density of 0.93 g/cm$^3$ or less.

24. The method of claim 21 in which said LLDPE has a density of 0.93 g/cm$^3$ or less.

* * * * *

UNITED STATES PATENT AND TRADEMARK OFFICE
CERTIFICATE OF CORRECTION

PATENT NO. : 4,965,034

DATED : October 23, 1990

INVENTOR(S) : Richard G. Shaw et al

It is certified that error appears in the above-identified patent and that said Letters Patent is hereby corrected as shown below:

Col. 3, line 21          Claim 2, after "the" insert --composition.--

Col. 4, line 19          Claim 19, delete [claim 11] and insert --claim 17--.

Signed and Sealed this

Nineteenth Day of May, 1992

Attest:

DOUGLAS B. COMER

Attesting Officer            Acting Commissioner of Patents and Trademarks